United States Patent [19]

Isaacs et al.

[11] 3,857,806

[45] Dec. 31, 1974

[54] VINYL ACETATE-ALPHA OLEFIN COATING COMPOSITIONS

[75] Inventors: Philip K. Isaacs, Jerusalem, Israel; Alexander C. Paton, Bedford, Mass.

[73] Assignee: W. R. Grace & Co., Cambridge, Mass.

[22] Filed: Mar. 15, 1971

[21] Appl. No.: 124,539

Related U.S. Application Data

[63] Continuation-in-part of Ser. No. 838,022, June 19, 1969, abandoned, which is a continuation of Ser. No. 560,841, June 27, 1966, abandoned.

[52] U.S. Cl............... 260/29.6 R, 260/8, 260/17 R, 260/17.4 ST, 260/29.6 T, 260/29.6 RB, 260/29.6 WA, 260/29.6 ME, 260/29.7 R, 260/29.7 T, 260/87.3
[51] Int. Cl. ............................................. C08f 45/24
[58] Field of Search .......... 260/29.6 R, 29.6 T, 87.3

[56] References Cited
UNITED STATES PATENTS

| | | | |
|---|---|---|---|
| 2,703,794 | 3/1955 | Roedel........................... | 260/29.6 R |
| 2,800,453 | 7/1957 | Bondi et al. ...................... | 260/87.3 |
| 3,240,766 | 3/1966 | Thomson et al. .................. | 260/87.3 |

*Primary Examiner*—Harold D. Anderson
*Attorney, Agent, or Firm*—C. Edward Parker; William L. Baker

[57] ABSTRACT

High molecular weight copolymers containing about 70 to 99 weight percent vinyl acetate and about 1 to 30 weight percent of a straight chain alpha olefin containing 7 to 20 carbon atoms are prepared by aqueous emulsion polymerization. The resulting aqueous latices are particularly useful in coating compositions, e.g., paints and adhesives.

5 Claims, No Drawings

VINYL ACETATE-ALPHA OLEFIN COATING COMPOSITIONS

This application is a continuation-in-part of application Ser. No. 838,022, filed June 19, 1969 now abandoned, which is a continuation of application Ser. No. 560,841 filed June 27, 1966 now abandoned.

This invention relates to novel vinyl acetate/higher olefin copolymer compositions and, more particularly, to high molecular weight vinyl acetate/alpha olefin copolymer compositions.

Vinyl acetate copolymers have been found to be useful in a number of applications, particularly in the form of aqueous latices as coating compositions such as paints and adhesives. Novel vinyl acetate/higher olefin copolymers have now been prepared which possess relatively high molecular weights, as determined by intrinsic viscosity measurements. The molecular weights are substantially as high or higher than vinyl acetate homopolymers which have molecular weights of about 50,000 to 250,000.

The novel copolymers of the present invention are prepared from vinyl acetate copolymerized with a straight chain alpha olefin having 7 to 20 carbon atoms and have an intrinsic viscosity in acetone at 30°C of at least 0.2 deciliters per gram. Intrinsic viscosities as high as 1.2 have been found in the polymers of this invention. The copolymers contain from about 70 to 99, preferably about 75 to 90, weight percent of vinyl acetate and about 1 to 30, preferably about 10 to 25 weight percent higher olefin. In a particularly preferred embodiment, the copolymers of the present invention contain about 10 percent olefin and have an intrinsic viscosity of about 0.7 to 0.9.

The novel copolymers are prepared by emulsion polymerization methods. The following procedure illustrates one method of preparing the copolymers of the present invention.

| Monomer blend | Wt.% |
|---|---|
| Monomers | 53.57 |
| Emulsifier System | |
| Nonylphenoxypoly(ethyleneoxy)ethanol | 0.66 |
| Sodium alkyl aryl sulfonate | 0.53 |
| Sodium acetate | 0.24 |
| Sodium citrate | 0.09 |
| Fumaric acid | 0.10 |
| Acetic acid (50%) | 0.06 |
| Water | 39.06 |
| Catalyst System | Wt.% |
| Potassium Persulfate (5% solution) | 3.16 |
| Sodium Formaldehyde Sulfoxylate (5% solution) | 2.42 |
| Tertiary Butyl Hydroperoxide | 0.11 |
| 1% Ferric Chloride Solution 0.037 cc per 100 grams monomer | |

The emulsifier system is placed in a reaction vessel and the temperature is raised to about 70° to 75°C. When the temperature is attained, the potassium persulfate and the addition of the monomer blend is begun at such a rate that the addition time requires 3 to 3½ hours. After the addition of the monomers, the temperature is raised to reflux. One hour after the monomers have been added, the ferric chloride solution is added and the sodium formaldehyde sulfoxylate is added at a rate such that three hours are required for the addition. The tertiary butyl hydroperoxide is then added in 10 equal parts at 15 minute intervals. The temperature is then raised to 90° to 95°C. and maintained at this temperature for about 1 hour after which the reaction mixture was cooled.

A series of copolymers having varying amounts of olefin were stripped of residual-free monomer and dried to isolate the non-volatile polymer fraction. The dried polymer materials were then dissolved in acetone and the intrinsic viscosity was determined with a Cannon-Fenske ASTM Viscosimeter at 30°C. The composition and the intrinsic viscosity of the polymers are set forth in Table 1 below.

Table 1

| Example No. | Weight % Vinyl Acetate | Weight % $C_9$-$C_{11}$ Olefin | Intrinsic Viscosity Deciliters per gram |
|---|---|---|---|
| 1 | 100 | 0 | .821 |
| 2 | 90 | 10 | 1.102 |
| 3 | 80 | 20 | .362 |
| 4 | 70 | 30 | .206 |

In an alternative embodiment a polymer within the scope of the present invention was prepared by the following batch polymerization method.

Example 5

67.5 g. of vinyl acetate, 7.5 g. of $C_6$-$C_7$ alpha olefin, 0.6 g. of potassium persulfite, 0.3 g. of sodium bisulfite, 3.3 g. of 2 percent alkyl benzene sodium sulfonate and 65 g. of water were refluxed for 5 hours and 40 minutes. The conversion was 10.5%.

The novel copolymers of the present invention may be hydrolyzed to the corresponding vinyl alcohol copolymer by conventional methods known to the art. Vinyl alcohol copolymers were prepared from the vinyl acetate/olefin copolymers of the examples by hydrolysis with sodium hydroxide in a methanol-water medium with a 50 percent excess of base. Substantially complete hydrolysis was achieved. The solubility under standard conditions of the vinyl alcohol copolymers of the present invention is less than 4 percent in water with the polymers containing $C_7$ to $C_{12}$ olefins having a solubility of less than 1 percent in water. The viscosity of such solutions is found to be less than 10 cps as determined by Brookfiled LNF Viscosimeter No. 1 Spindle at 25°C. Since vinyl alcohol polymers are generally water-soluble, it is unexpected that the vinyl alcohol copolymers of the present invention, even at high degree of hydrolysis, are substantially water-insoluble. The vinyl alcohol/olefin copolymers are useful as adhesives, emulsion stabilizers and coating compositions.

The straight chain alpha olefins employed in the present invention are known to the art and are prepared by conventional methods, e.g., by wax cracking and ethylene telomerization. It should be understood that minor amounts of impurities may be present in the olefin materials such as branched chain olefins, internal olefins, conjugated and non-conjugated diolefins, naphthenic hydrocarbons and saturated hydrocarbons.

As mentioned above, the copolymer composition of the invention is particularly useful in the form of an aqueous latex in coating compositions such as aqueous based paints and adhesives. In use in aqueous based paints, the copolymer composition provides films of excellent flexibility characteristics. Such aqueous based paints generally comprise water in which pigment, for example, titanium dioxide, lithopone or zinc oxide and the film-forming or binder copolymer composition of the invention are dispersed. The amount of pigment and film-forming ingredient or binder can vary widely according to the specific ingredients employed and the end use of the composition. In the paint art, composition is conventionally expressed in terms of the ratio of pigment by volume to the total volume of the non-volatile components present in the composition (PVC). Thus an aqueous based paint composition employing the film-forming copolymer of the invention as the binder component may generally contain say about 10 to 70 percent by volume of pigment (including extenders as mentioned below) based on the total volume of the non-volatiles (pigment plus binder copolymer). Obviously the amount of water can vary widely, often anywhere between 10 and 70 percent by weight, based on the total weight of the paint. In all cases, an amount of the binder copolymer is employed which is at least sufficient to form a film upon drying.

It is the general practice to include any one or more of several optional additional ingredients in such aqueous based paints. For example, the paint compositions can include extenders such as mica, talc, china clay, barium sulphate, calcium carbonate, dolomite, calcium silicate, silica, diatomaceous earth, etc. Color may be provided through the use of organic pigments, iron oxide, chromic oxide, carbon black, sienna, umber, ochre, etc.

Aqueous based paints usually also include a variety of wetting or dispersing agents, such as polyphosphates, pyrophosphates, anionic and non-ionic surfactants, polyacrylates, polymethacrylates, polyvinyl alcohol, polyethylene glycol, etc. Additional optional ingredients further include freeze-thaw stabilizers such as ethylene glycol, diethylene glycol, and nonionic surfactants; preservatives such as organomercuric and organo-tin compounds, alkylated, halogenated or arylated phenols and their derivatives, antibiotics and many others. Still further optional ingredients include foam breakers such as silicones, ditertiary acetylinic glycols, long-chain ethylene oxide condensates, tributyl phosphate, pine oil and higher aliphatic alcohols. Starch, casein, methyl cellulose, hydroxy ethyl cellulose, vegetable gum, etc. are also conventionally employed in aqueous based paints.

The following is a detailed, non-limiting example illustrating the use of a copolymer of the invention as the film-forming or binder component in an aqueous based paint:

Example C

| Ingredients | Parts by Weight |
|---|---|
| 1. Water | 110.0 |

Example C-Continued

| | Ingredients | Parts by Weight |
|---|---|---|
| 2. | Tamol 731, 25% (sodium salt of carboxylated anionic surface active agent) | 8.4 |
| 3. | Igepol CTA 639 (alkylphenyiethylene oxide adduct) | 1.5 |
| 4. | Tetrapotassium pyrophosphate | 1.0 |
| 5. | Polyglycol P-1200 (polypropylene glycol) | 2.0 |
| 6. | Mersolite 90 (phenylmercuric borate) | 0.5 |
| 7. | Methocel solution, 3% (methyl cellulose; 65 HG, 4000 DG) | 70.0 |
| 8. | Titanox RANC (titanium dioxide) | 200.0 |
| 9. | Snowflake White (calcium carbonate) | 100.0 |
| 10. | Mica, 325 mesh | 30.0 |
| 11. | Water | 26.0 |
| 12. | Foamicide 581-B (Colloids Inc.) | 1.0 |
| 13. | Carbitol Acetate (acetate of ethylene glycol monoethyl ether | 20.0 |
| 14. | Water | 20.0 |
| 15. | Methocell solution, 3% | 68.5 |
| 16. | Latex prepared as in Example 5 | 394.0 |
| 17. | Ethylene glycol | 40.0 |

It is claimed:

1. A latex coating composition consisting essentially of water and dispersed therein pigment and a film-forming amount of a copolymeric component, said copolymeric component consisting of from about 70 to 99 weight percent vinyl acetate copolymerized with from about 1 to 30 weight percent $C_7$ to $C_{20}$ straight chain alpha olefin, said copolymer having an intrinsic viscosity in acetone at 30°C. of at least 0.2 deciliters per gram.

2. The composition of claim 1 wherein said alpha olefin is a $C_9$ to $C_{11}$ alpha olefin fraction.

3. The composition of claim 1 wherein said copolymer contains 10 weight percent alpha olefin and said intrinsic viscosity is about 0.7 to 0.9 deciliters per gram.

4. The coating composition of claim 1 wherein said alpha olefin is a $C_9$ to $C_{10}$ alpha olefin fraction.

5. An aqueous latex paint composition consisting essentially of water and dispersed therein pigment and a film-forming amount of a copolymeric component, said copolymeric component consisting of from about 70 to 99 weight percent vinyl acetate copolymerized with from about 1 to 30 weight percent $C_7$ to $C_{20}$ straight chain alpha olefin, said copolymer having an intrinsic viscosity in acetone at 30°C. of at least 0.2 deciliters per gram, said pigment being present in an amount of about 10 to 70 percent by volume, based on the total volume of non-volatile materials in the paint composition.

* * * * *